(12) United States Patent
Swanson et al.

(10) Patent No.: US 8,506,668 B2
(45) Date of Patent: Aug. 13, 2013

(54) FLUTED FILTER WITH AXIAL SEAL

(75) Inventors: Kyle Swanson, Kearney, NE (US); Chad Banzhaf, Kearney, NE (US); Steven J. Merritt, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 586 days.

(21) Appl. No.: 12/414,090

(22) Filed: Mar. 30, 2009

(65) Prior Publication Data

US 2010/0242425 A1    Sep. 30, 2010

(51) Int. Cl.
 *B01D 46/00* (2006.01)
(52) U.S. Cl.
 USPC .................................. 55/502; 55/498; 55/521
(58) Field of Classification Search
 USPC ........................................... 55/498, 502, 521
 See application file for complete search history.

(56) References Cited

U.S. PATENT DOCUMENTS

| | | |
|---|---|---|
| 4,498,989 A | 2/1985 | Miyakawa et al. |
| 5,043,000 A | 8/1991 | Kadoya |
| 5,554,205 A | 9/1996 | Ernst et al. |
| 5,820,646 A | 10/1998 | Gillingham et al. |
| 5,902,364 A | 5/1999 | Tokar et al. |
| 6,179,890 B1 | 1/2001 | Ramos et al. |
| 6,189,890 B1 | 2/2001 | Moulin et al. |
| 6,210,469 B1 | 4/2001 | Tokar |
| 6,221,122 B1 | 4/2001 | Gieseke et al. |
| 6,235,195 B1 | 5/2001 | Tokar |
| 6,348,084 B1 | 2/2002 | Gieseke et al. |
| D455,483 S | 4/2002 | Gieseke et al. |
| 6,517,598 B2 | 2/2003 | Anderson et al. |
| 6,610,117 B2 | 8/2003 | Gieseke et al. |
| 6,610,126 B2 | 8/2003 | Xu et al. |
| D484,584 S | 12/2003 | Anderson et al. |
| 6,878,190 B1 | 4/2005 | Xu et al. |
| D506,539 S | 6/2005 | Bishop et al. |
| 6,966,940 B2 | 11/2005 | Krisko et al. |
| 6,994,744 B2 | 2/2006 | Tokar et al. |
| 6,997,968 B2 | 2/2006 | Xu et al. |
| 7,001,450 B2 | 2/2006 | Gieseke et al. |
| 7,004,986 B2 | 2/2006 | Kopec et al. |
| 7,008,467 B2 | 3/2006 | Krisko et al. |
| 7,211,124 B2 | 5/2007 | Gieseke et |
| 7,255,300 B2 | 8/2007 | Johnston |
| 7,318,851 B2 | 1/2008 | Brown et al. |

(Continued)

FOREIGN PATENT DOCUMENTS

| | | |
|---|---|---|
| DE | 3328218 | 2/1984 |
| DE | 102006028161 A1 | 12/2007 |

(Continued)

OTHER PUBLICATIONS

U.S. Appl. No. 11/634,647, filed Dec. 6, 2006, Merritt.

(Continued)

*Primary Examiner* — Robert Clemente
(74) *Attorney, Agent, or Firm* — Reinhart Boerner Van Deuren P.C.

(57) ABSTRACT

A filter element includes a filter media pack and an axial seal member configured to axially seal against a filter housing. The axial seal member may be supported by and attached to the filter media pack by a media pack seal member. Alternatively, the axial seal member may be carried by a frame, which is attached to the filter media pack by the media pack seal member.

26 Claims, 6 Drawing Sheets

(56) References Cited

U.S. PATENT DOCUMENTS

| | | |
|---|---|---|
| 7,753,982 B2 | 7/2010 | Merritt |
| 2004/0060861 A1 | 4/2004 | Winter et al. |
| 2005/0022484 A1 | 2/2005 | Krisko et al. |
| 2005/0022669 A1 | 2/2005 | Xu et al. |
| 2006/0081528 A1 | 4/2006 | Oelpke et al. |
| 2006/0090434 A1 | 5/2006 | Brown et al. |
| 2006/0091061 A1 | 5/2006 | Brown |
| 2006/0091064 A1 | 5/2006 | Brown |
| 2006/0091066 A1 | 5/2006 | Driml et al. |
| 2006/0091084 A1 | 5/2006 | Merritt et al. |
| 2006/0101795 A1 | 5/2006 | Krisko et al. |
| 2006/0101999 A1 | 5/2006 | Steins |
| 2006/0123754 A1 | 6/2006 | Oelpke et al. |
| 2006/0151655 A1 | 7/2006 | Johnston |
| 2007/0006560 A1 | 1/2007 | Ruhland et al. |
| 2007/0017517 A1 | 1/2007 | Hallback et al. |
| 2007/0039296 A1 | 2/2007 | Schrage et al. |
| 2007/0169449 A1 | 7/2007 | Merritt |
| 2007/0175187 A1 | 8/2007 | Kopec et al. |
| 2007/0175194 A1 | 8/2007 | Nepsund et al. |
| 2007/0186528 A1 | 8/2007 | Wydeven |
| 2007/0193236 A1 | 8/2007 | Merritt |
| 2007/0271885 A1 | 11/2007 | Rieger et al. |
| 2007/0271886 A1 | 11/2007 | Rieger et al. |
| 2007/0289265 A1 | 12/2007 | Coulonvaux et al. |
| 2008/0011896 A1 | 1/2008 | Johnston et al. |
| 2008/0016832 A1 | 1/2008 | Krisko et al. |
| 2008/0060329 A1 | 3/2008 | Brown et al. |
| 2008/0135470 A1 | 6/2008 | Merritt et al. |
| 2008/0135471 A1 | 6/2008 | Merritt et al. |
| 2009/0114590 A1 | 5/2009 | Merritt et al. |
| 2009/0205302 A1 | 8/2009 | Rieger |
| 2009/0320423 A1 | 12/2009 | Merritt et al. |
| 2009/0320424 A1 | 12/2009 | Merritt et al. |
| 2010/0000934 A1 | 1/2010 | Brown |
| 2010/0192530 A1 | 8/2010 | Wydeven et al. |
| 2010/0242425 A1 | 9/2010 | Swanson et al. |

FOREIGN PATENT DOCUMENTS

| | | |
|---|---|---|
| EP | 0639474 A1 | 2/1995 |
| EP | 1350550 A1 | 10/2003 |
| GB | 1 296 051 | 11/1969 |
| JP | 57140554 A | 8/1982 |
| JP | 58074122 | 5/1983 |
| JP | 59019518 | 2/1984 |
| JP | 60-112320 | 7/1985 |
| JP | 60-124622 | 8/1985 |
| JP | 63-122617 | 6/1988 |
| JP | 63-302915 | 12/1988 |
| WO | WO 2005/058461 A1 | 6/2005 |
| WO | WO 2005/107924 A2 | 11/2005 |
| WO | WO 2005/123214 A1 | 12/2005 |
| WO | WO 2006/012386 A2 | 2/2006 |
| WO | WO 2006/014941 A2 | 2/2006 |
| WO | WO 2006014941 A2 * | 2/2006 |
| WO | WO 2006/093960 A2 | 9/2006 |
| WO | WO 2007/009039 A1 | 1/2007 |
| WO | WO 2007/056589 A2 | 5/2007 |
| WO | WO 2007/149561 A2 | 12/2007 |
| WO | WO 2007144405 A1 * | 12/2007 |

OTHER PUBLICATIONS

U.S. Appl. No. 12/164,987, filed Jun. 30, 2008, Merritt.

* cited by examiner

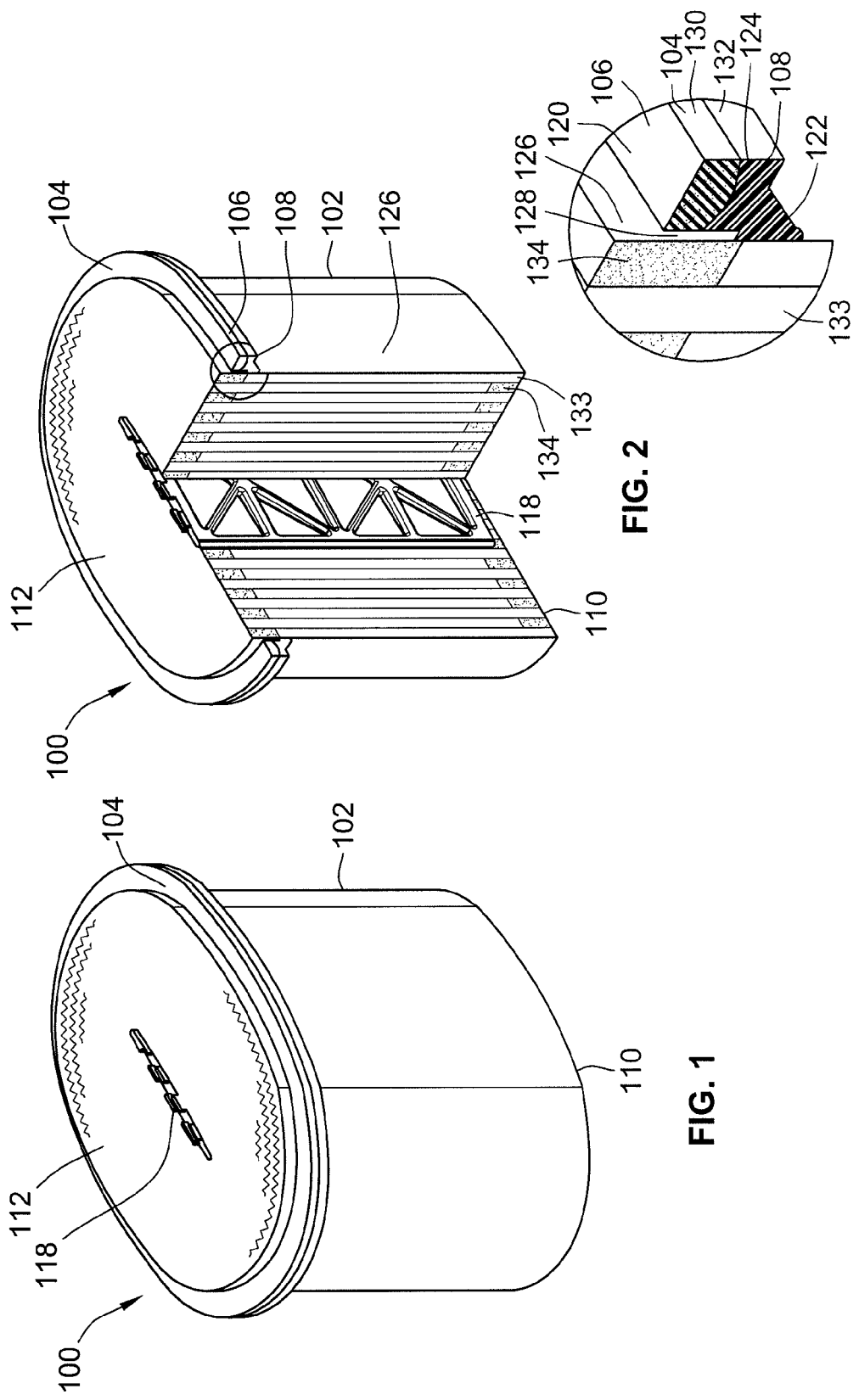

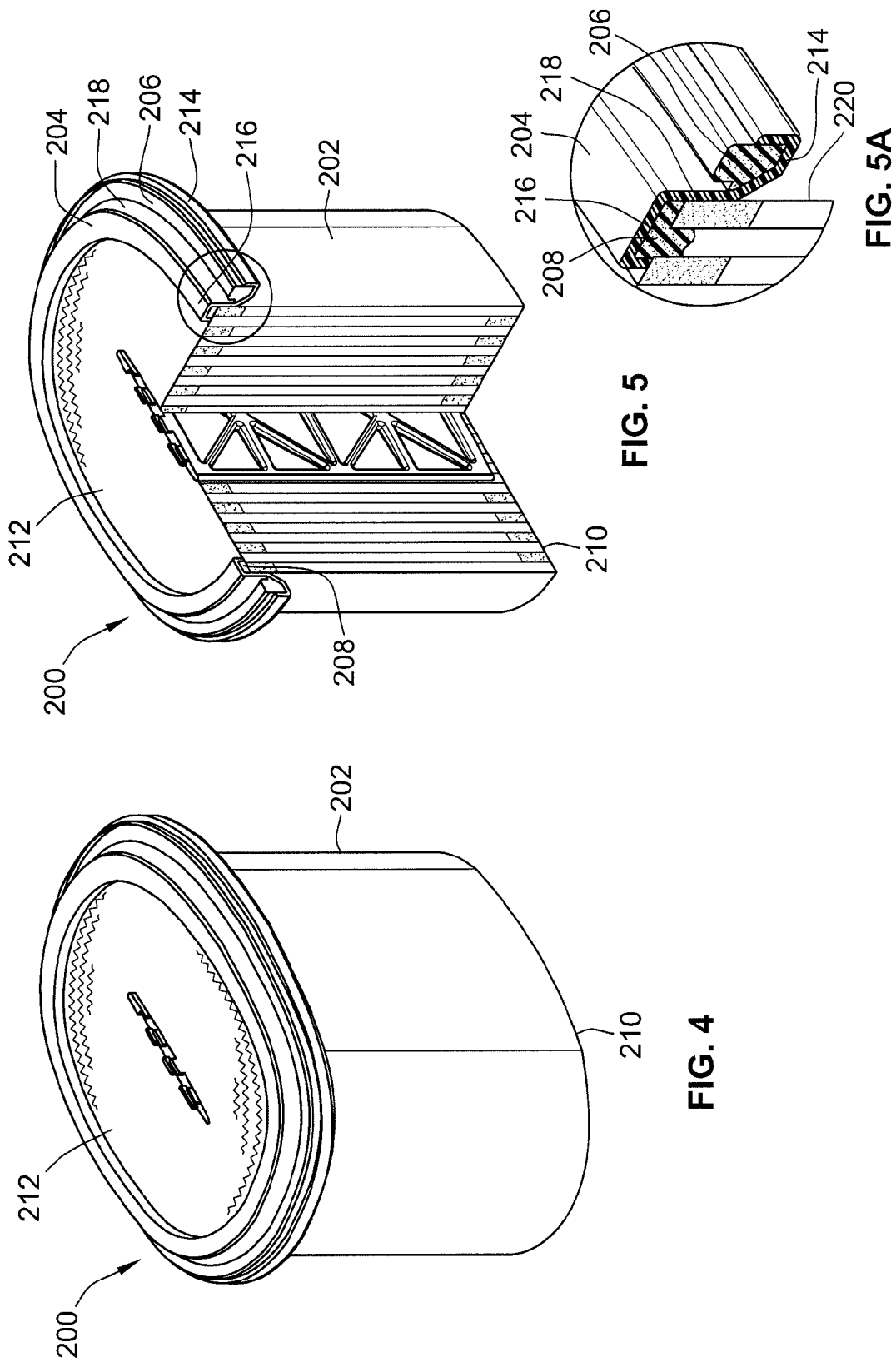

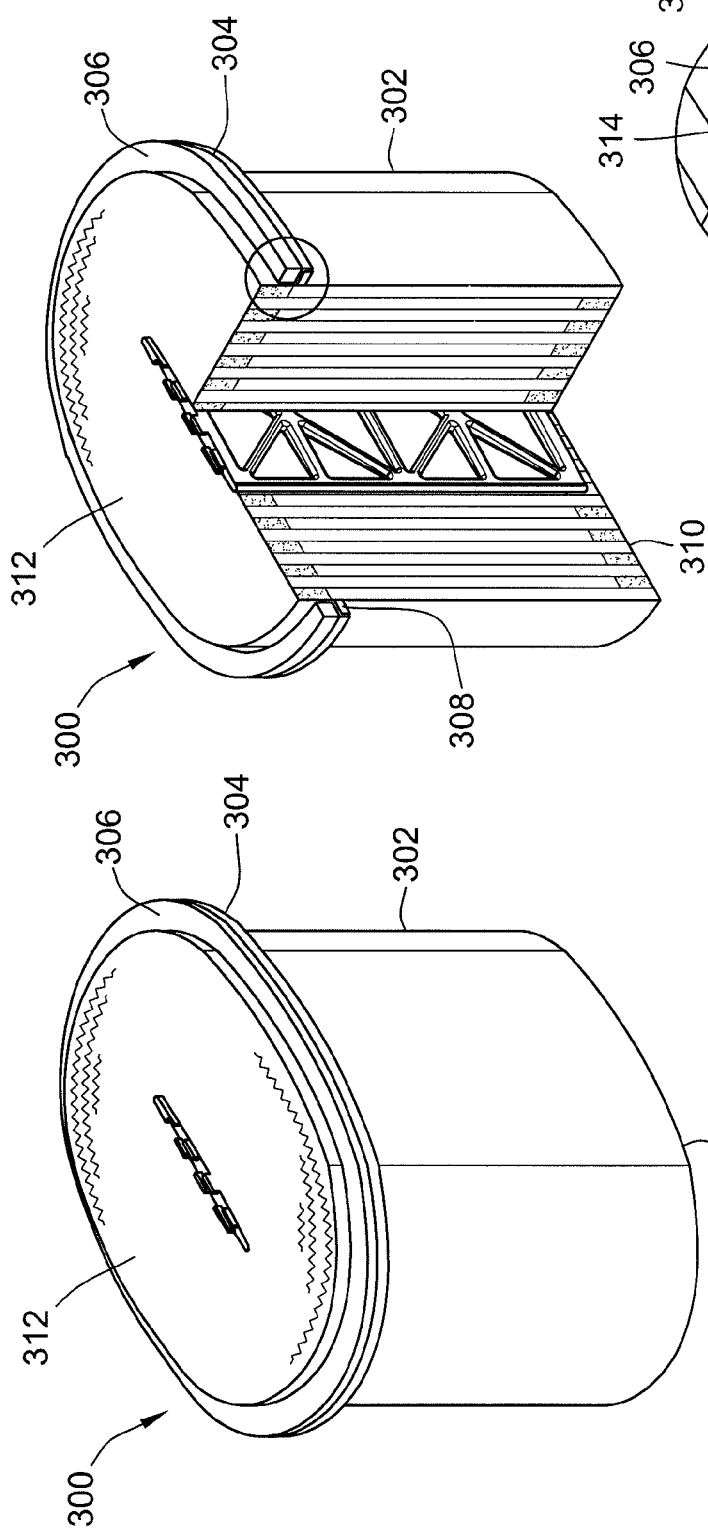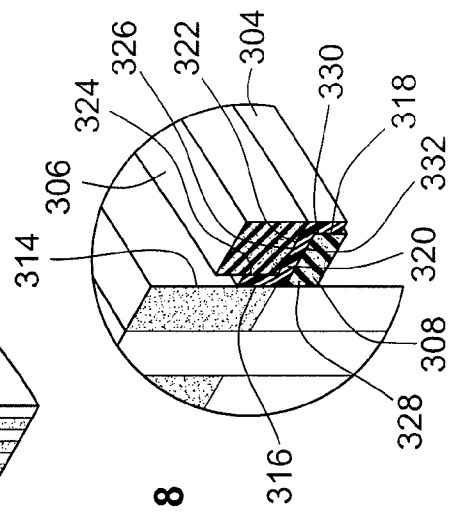

FLUTED FILTER WITH AXIAL SEAL

FIELD OF THE INVENTION

This invention generally relates to fluid filters, and more particularly to fluted filter elements having an axial seal member and a media pack seal member, and a method of making the same.

BACKGROUND OF THE INVENTION

Filtration devices and systems are employed in a wide range of applications for filtering contaminants from various fluids. For example, it is known to pass air or similar gases through filter assemblies that enclose filtration media such as filter paper to remove dust and other contaminants. The filtration media is typically enclosed within a housing that is a permanent part of a larger overall process system (e.g. an engine) that utilizes the filtered fluids. Desirably, to prevent clogging of the filter, the filter assembly is constructed to facilitate the removal and replacement of the filtration media from the permanent housing. For this reason, the filtration media is typically configured into removable filter elements, also referred to herein as filter cartridges.

One commonly used filter media in construction of filter elements is fluted filter media. Fluted filter media is typically formed by winding a fluted sheet and a face sheet about an axis to form a plurality of contiguous adjacent flutes. In one common form of such fluted filter media, alternating ends of adjacent flutes are blocked to cause fluid entering one open end of "inlet" flutes to flow through the porous filter media into adjacent "outlet" flutes prior to exiting the filter media at an opposite end of the flutes.

To enable removal of a filter element from the filter housing (not shown), typically, a clearance gap is provided between the two components. To cause process fluids to pass through the filtration media rather than short circuit around the filter element, the filter element is often provided with a seal that abuts against the filter housing. Prior such filter elements are disclosed in U.S. Pat. No. 6,610,117 (Gieseke), U.S. Patent Application Publication No. 2006/0091061 (Brown), U.S. Patent Application Publication No. 2006/0090434 (Brown, et al.), and U.S. patent application Ser. No. 12/164,987 (Merritt, et al.) herein incorporated by reference in their entireties.

The present invention pertains to improvements in frames, seal support structures and how they are attached to a filter, such as a fluted filter.

BRIEF SUMMARY OF THE INVENTION

One inventive aspect pertains to an axial gasket assembly configured to provide sealing between a filter element and a filter housing. According to this aspect, the invention provides a filter element including a fluted filter media pack and an axial seal gasket assembly attached to the fluted filter media. The fluted filter media includes a face sheet and a fluted sheet secured together to provide a plurality of flutes, wherein first flutes are closed proximate an inlet face and second flutes are closed proximate an outlet face. The axial seal gasket assembly includes an axial seal member and a media pack seal member, wherein the axial seal member is formed of a first polymeric material and the media pack seal member is formed of a second polymeric material, wherein the first polymeric material is softer than the second polymeric material.

In another aspect, the invention provides a filter element including a fluted filter media pack and an axial seal member carried by a frame, which is attached to the fluted filter media pack by a media pack seal member. The fluted filter media includes a face sheet and a fluted sheet secured together to provide a plurality of flutes, wherein first flutes are closed proximate an inlet face and second flutes are closed proximate an outlet face. The frame is secured to the fluted filter media pack by a media pack seal member and includes an axial seal support portion. The axial seal member is carried by the axial seal support portion of the frame, wherein the axial seal member is molded independent of the media pack seal member. Further, the axial seal member is formed of a first polymeric material and the media pack seal member is formed of a second polymeric material, wherein the first polymeric material is softer than the second polymeric material.

The present invention also provides for various methods of making a filter element for use with a filter housing having a filter housing sealing surface. In one aspect, the invention provides a method of making a filter element including steps of forming a fluted filter media pack having a plurality of flutes, wherein first flutes are closed proximate an outlet face and second flutes are closed proximate an inlet face, molding a media pack seal member, and separately molding an axial seal member configured for axially sealing against the filter housing sealing surface. The step of molding a media pack seal member may be performed before or after the step of molding an axial seal member. Further, the media pack seal member and the axial seal member may be molded in a single mold cavity to form an axial seal gasket. Alternatively, the method may further include a step of providing a frame wherein the media pack seal member and the axial seal member can be molded and attached.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 1 is a perspective view of a filter element including an axial seal gasket assembly according to a first embodiment of the invention, adapted for insertion into a filter housing;

FIG. 2 is a perspective partial cross-sectional view of the filter element of FIG. 1 including a fluted filter media pack, a winding core and the axial seal gasket;

FIG. 2A is an enlarged cross-sectional view of FIG. 2 showing an enlarged cross-section of the axial seal gasket assembly attached to the fluted filter media pack;

FIG. 4 is a perspective view of a filter element including a frame carrying an axial seal member according to a second embodiment of the invention;

FIG. 5 is a perspective partial cross-sectional view of the filter element of FIG. 4 including a fluted filter media pack, a winding core and the frame, which is attached to the fluted filter media pack by a media pack seal member, carrying the axial seal member;

FIG. 5A is an enlarged cross-sectional view of FIG. 5 showing an enlarged cross section of the axial seal member, the media pack seal member and the frame attached to the fluted filter media pack;

FIG. 7 is a perspective view of a filter element including a frame carrying an axial seal member according to a third embodiment of the invention;

FIG. 8 is a perspective partial cross-sectional view of the filter element of FIG. 7 including a fluted filter media pack, winding core and a frame, which is attached to the fluted filter media pack by a media pack seal member, carrying the axial seal member;

FIG. 8A is an enlarged cross-sectional view of FIG. 8 showing an enlarged cross section of the axial seal member, the media pack seal member and the frame attached to the fluted filter media pack.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 3:
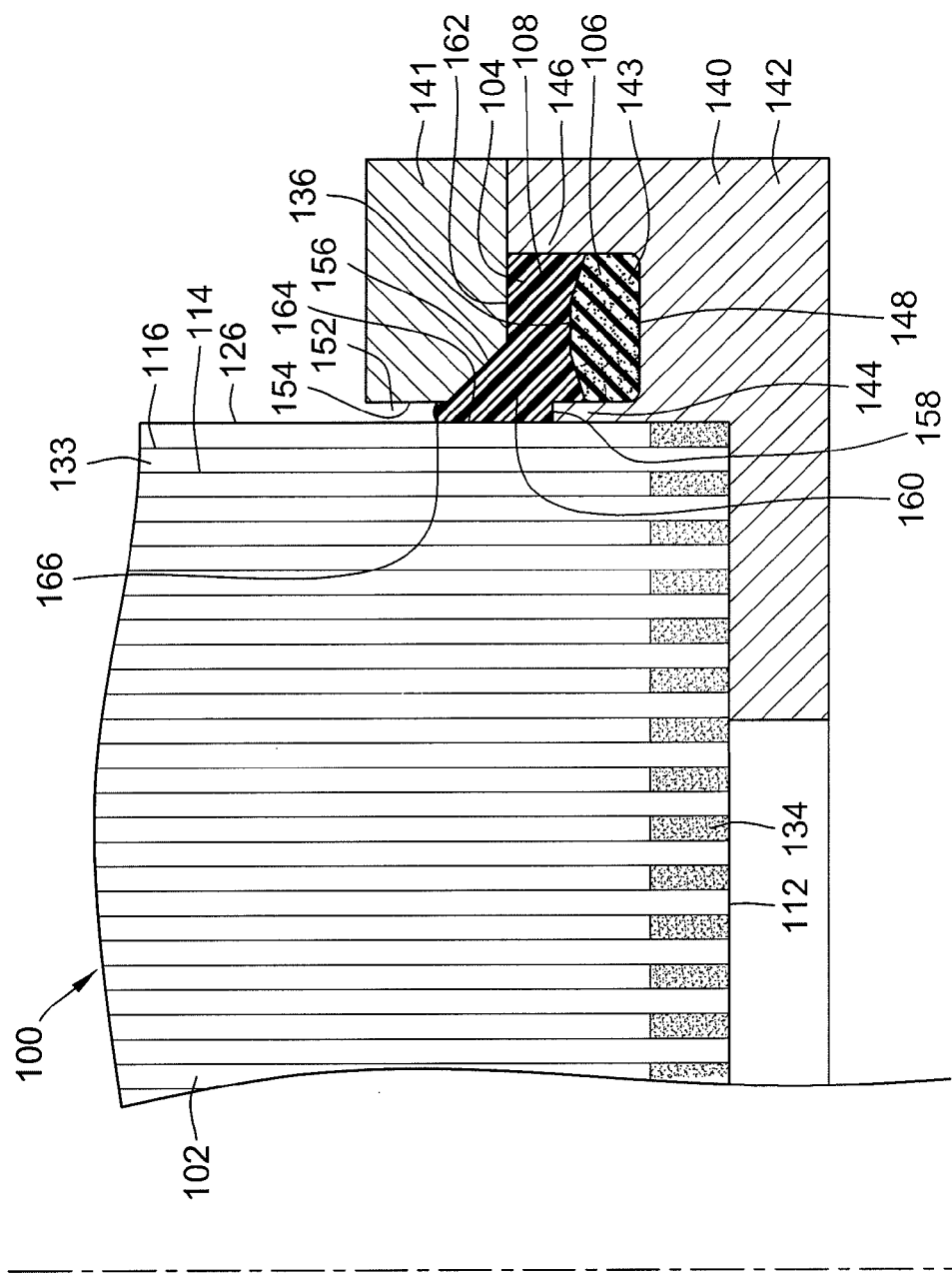
FIG. 3 is an enlarged fragmentary and cross-sectional view of the filter element of FIG. 1 showing the axial seal gasket formed in a mold.

FIGS. 1-3 show a first embodiment of the present invention in the form of a filter element 100, adapted for insertion into a filter housing for removing particulate matter from a flow of fluid passing through the filter housing. The term fluid as used herein is intended to include fluids in either liquid or gaseous forms; however, the embodiments shown herein illustrate an air filter of the type used for filtering intake air for engine and air compressors. It is understood that inventive features may also be applicable to liquid applications.

The filter element 100 of the first embodiment is generally shown in FIGS. 1-2 as an annular shape with a race-track-like cross section. The term "annular" is used herein in accordance with the common dictionary definition to describe a variety of ring-like shapes disposed about an axis or centerline. Annular shapes, as contemplated by the inventors, may include, but are not limited to, shapes that are round, rectangular, oval, or race-track-like with two generally straight and parallel sides joined by rounded ends.

To generally introduce different components, the filter element 100, as shown in FIGS. 1-2, includes a filter media pack 102, an axial seal gasket 104 comprising an axial seal member 106 and a media pack seal member 108. The filter media pack 102 of the first embodiment is a fluted filter media having an inlet face 110 and an outlet face 112. The fluted filter media pack 102 includes a face sheet 114 and a fluted sheet 116 secured together and wound about a winding core 118 to define a plurality of flutes. The first set of the plurality flutes are closed proximate the inlet face 110 and the second set of the plurality of flutes are closed proximate the outlet face 112, such that fluids entering the flutes, which are open at the inlet face 110, flow through the porous filter media into other flutes prior to exiting the filter media at the outlet face 112 of the flutes. The winding core 118 can take various shapes and dimensions. One example of the winding core 118 is disclosed in U.S. patent application Ser. No. 11/634,647, entitled "Fluid Filter Apparatus Having Filter Media Wound About a Winding Frame," assigned to the Assignee of the present invention, and incorporated herein by reference. In alternative embodiments, the fluted filter media pack 102 may be formed without using a winding core.

The axial seal gasket 104 is provided proximate the outlet face 112 of the filter media pack 102. The axial seal gasket 104 includes the axial seal member 106 for engaging a housing having a sealing surface (not shown.) The axial seal member 106 has a sealing surface 120 configured to seal against the sealing surface of the filter housing to form an axial seal between the filter housing and the filter element 100. When the filter element 100 is placed in the filter housing, the axial seal member 106 is compressed against the sealing surface of the filter housing such that the sealing surface 120 of the axial seal member 106 and the sealing surface of the filter housing provide a seal between the filter element 100 and the housing to prevent any unfiltered air from bypassing the filter media pack 102 while flowing through the filter housing. The axial seal member 106 may be formed of any suitable sealing materials including but not limited to polymeric materials and polymer foams, preferably, urethane foam. Expandable materials such as urethane are particularly advantageous because they are resilient to provide a sealing function and can be molded on the media pack seal member 108 or on a frame as will be discussed below.

In this embodiment, as shown in FIGS. 1-3, the axial seal member 106 is carried by the media pack seal member 108. The media pack seal member 108 has a media pack seal portion 122 and an axial seal support portion 124. The media pack seal member 108 is attached to the filter media pack 102, wherein the media pack seal portion 122 is radially sealed against a circumferential wall 126 of the filter media pack 102. The media pack seal portion 122 is attached to the circumferential wall 126 proximate the outlet face 112, axially spaced from the outlet face 112. The axial seal support portion 124 is integrally formed with the media pack seal portion 122. The axial seal support portion 124 carries the axial seal member 106 radially spaced from the circumferential wall 126 of the filter media pack 102, such that a space 128 is formed between the axial seal member 106 and the circumferential wall 126.

The media pack seal member 108 may be formed of any suitable materials including but not limited to polymeric materials and polymer foams, preferably, a rigid urethane. The axial seal member 106 and the media pack seal member 108 may be formed using the same material or different materials. Preferably, the axial seal member 106 is formed of a softer polymeric material than that of the media pack seal member 108, such that the axial seal member 106 may be compressed to seal against the filter housing while media pack seal member 108 formed of a more rigid polymer supports the filter element 100 when placed in the filter housing. The media pack seal member 108 may also provide a sealing function.

In such an embodiment, the media pack seal member 108 is formed of a rigid urethane having a durometer reading greater than 60 A (all duromoeter readings herein are in ASTM D2240 type A scale using Shore Durometer Type A testing equipment), and preferably between 90 A and 95 A; while the axial seal member 106 is formed of a softer urethane foam having a durometer reading less than 25 A, and preferably between 5 A and 8 A. The rigid urethane used for the media pack seal member 108 is a urethane material that expands less than 40% in volume during curing, and the softer urethane foam used for the axial seal member 106 is a urethane material that expands more than 40% of volume during curing. Typically, the rigid urethane and the softer urethane foam materials are formulated differently, each including a different polyol. In this manner, the media pack seal member 108 is molded with a much more controlled process while the axial seal member 106 is less controlled, but more resilient and forgiving for its use with an external housing surface. In one embodiment, the media pack seal member 108 has a durometer reading of about 92 A which is formed of a rigid urethane that foams about 25% in volume during curing, and the axial seal member 106 has a durometer reading of about 7 A and is formed of a softer urethane that foams about 60% in volume during curing. In such embodiments, the media pack seal member 108 formed of a rigid urethane provides a structural support, while the axial seal member 106 formed of a softer urethane foam, which is more resilient than the rigid urethane, provides a sealing function between the filter element 100 and the filter housing (not shown.)

As it will be explained in detail below, the axial seal gasket 104 is preferably molded in a mold. Therefore, in such embodiments, each of the axial seal member 106 and the media pack seal member includes a free rise surface 136 and 166 which takes an irregular shape during a foaming, expanding and curing process. In one embodiment, a radial width of the axial seal gasket 104 proximate the free rise surface 136 is at least 0.5 inches. In some embodiments, the axial seal gasket 104 may provide an additional radial sealing surface between the filter element 100 and the filter housing via an outer circumferential wall 130 of the axial seal member 106 and an outer circumferential wall 132 of the media pack seal member 108, wherein the outer circumferential walls 130, 132 seal against an inner wall of the filter housing, while the sealing surface 120 of the axial seal member provides an axial seal against the sealing surface of the filter housing.

In one embodiment, the filter element 100 is formed by first forming the filter media pack 102, then attaching the axial seal gasket 104 on the filter media pack 102 by molding the axial seal gasket 104. The filter media pack 102 may be constructed from the fluted sheet of porous filter media 116 secured together with the face sheet 114 of porous filter media. The fluted sheet 116 may be formed by any appropriate process, such as corrugating or pleating, but preferably by gathering as described in U.S. Patent Publication No. 2006/0091066, entitled "Gathered Filter Media for an Air Filter and Method of Making Same," assigned to the Assignee of the present invention, and incorporated herein by reference.

The term "face sheet", as used herein, is intended to encompass any form of sheet or strip of generally flat, porous or non-porous, material attached to the fluted sheet of porous filter material. In most embodiments of the invention, the face sheet would preferably be formed of a porous filter material.

The fluted sheet of porous filter material 116 forms a plurality of contiguous adjacent convolutions, commonly known in the industry as flutes 133. Selected ends of the flutes may be blocked, with a bead of adhesive 134, for example, to cause fluid entering one end of some of the flutes to flow through the porous filter media into other flutes prior to exiting the filter media at an opposite end of the flutes, in the manner known in the art.

The filter media pack 102 in FIGS. 1-3 is formed by winding and coiling the filter media to form a generally annular shape, such as a race-track-like cross section, that is proportioned for insertion into a filter housing having a generally same inner surface shape with a larger perimeter than the filter element 100 to provide a sliding clearance fit. The filter media pack 102 may be constructed with the winding core 118 as disclosed in U.S. Patent Publication No. 2008/0135471, entitled "Method and Apparatus for Winding a Filter Element," assigned to the Assignee of the present invention, and incorporated herein by reference. In other embodiments of the invention, the filter media pack 102 having other cross-sectional shapes, such as circular, square, rectangular, or polygonal, for example, may be utilized by coiling or bonding together successive wraps of the filter media. It is also understood that the invention is not limited to a filter media pack of fluted media. Those having skill in the art will readily recognize that the invention may also be practiced with efficacy, using other types of filter media.

After the filter media pack 102 is formed, the axial seal gasket 104 is formed and attached to the filter media pack 102. In one embodiment, the axial seal gasket 104 is formed in a mold 140 as shown in FIG. 3. The mold 140 is made up of at least one part, but in this embodiment has two parts including a cope 141 and a drag 142. However, contrary to a typical cope/drag mold, this is a "free rise" molding technique, wherein uncured fluid materials for the axial seal gasket 104 free rise and expand during curing. The drag 142 includes an annular cavity 143, which is defined by an inner wall 144, an outer wall 146 and a bottom wall 148. The outer wall 146 extends axially upward, in the opposite direction of the bottom wall 148, and intersects with a top wall 150 of the drag 142. The cope 141 seats on top of the top wall 150. As shown in FIG. 3, the cope 141 extends radially toward a center 151 of the mold 140 and stops short of the circumferential wall 126 of the filter media pack 102, such that a free rise gap 152 to accommodate expansion is formed between the circumferential wall 126 and an inner peripheral surface 154 of the cope 141. In this embodiment, the lower portion of the inner peripheral surface 154 tapers toward the outer wall 146, forming a tapered region 156, which intersects with an inner lower surface of the cope 141.

In this embodiment, the axial seal member 106 is first molded in the mold 140, then the media pack seal member 108 is subsequently molded in the mold 140. In this molding process, an uncured fluid sealing material for the axial seal member 106 is poured into the annular cavity 143 of the drag 150. In the annular cavity 143, the uncured fluid seal material is allowed to foam, expand and cure. During this expansion and curing process, the irregular free rise surface 136 is formed. An amount of the uncured fluid seal material used is adjusted such that when it has fully cured and expanded, the free rise surface 136 of the axial seal member 106 is lower than an top end 158 of the inner wall 144.

Once the uncured fluid seal material has cured or solidified to form the axial seal member 106 in the annular cavity 143, the filter media pack 102 is placed in the mold 140. The filter media pack 102 is inserted with the outlet face 112 facing the mold 140 and guided by the inner wall 144 as it is placed into the drag 150. When the filter media pack 102 is placed in the drag 150, a portion of the circumferential wall 126 proximate the outlet face 112 abuts the inner wall 144. As shown in FIG. 3, the inner wall 144 separates the circumferential wall 126 from the axial seal member 106, thereby forming the space 128 (FIG. 2) between the circumferential wall 126 and the axial seal member 106.

After placing the filter media pack 102 in the drag 150, the cope 141 is placed over the drag 150. As shown in FIG. 3, once the filter media pack 102 is inserted and the cope 141 is assembled, a molding receptacle region 160 for the media pack seal member 108 is formed. The molding receptacle region 160 is defined by the free rise surface 136 of the axial seal member 106, the outer wall 146 and the inner wall 144 of the drag 150, the circumferential wall 126 of the filter media pack 102, and the tapered region 156 and the inner lower surface 162 of the cope 141. In a molding process of the media pack seal member 108, an uncured fluid polymeric material is poured into the molding receptacle region 160 via the free rise gap 152 between the circumferential wall 126 and the inner peripheral surface 154 of the cope 141. Alternatively, the uncured fluid polymeric material may be poured over the axial seal member 106 in the annular cavity 143 before the cope 141 is placed over the drag 150. In the molding receptacle region 160, the uncured fluid polymeric material expands and cures. The expansion of the uncured fluid polymeric material is guided by the tapered region 156 and some uncured fluid polymeric material may expand into the free rise gap 152, forming the free rise surface 166 of the media pack seal member 108. During the curing process, the uncured fluid polymeric material expands to seal against the circumferential wall 126, such that an inner side 164 of the media pack seal member 106 is securely attached to the circumferential wall 126. Further, the axial seal member 106 and the media pack seal member 108 are securely attached to each other as the uncured fluid polymeric material for the media pack seal member 108 cures.

In another embodiment, the axial seal gasket 104 may be formed separately and subsequently attached to the filter media pack 102, for example, by a suitable adhesive. In yet a different embodiment, the axial seal member 106 and the media pack seal member 108 may be formed and provided separately, then subsequently bonded together, for example, by a suitable adhesive to form the axial seal gasket 104, which is then secured to the filter media pack 102.

Figure 6:
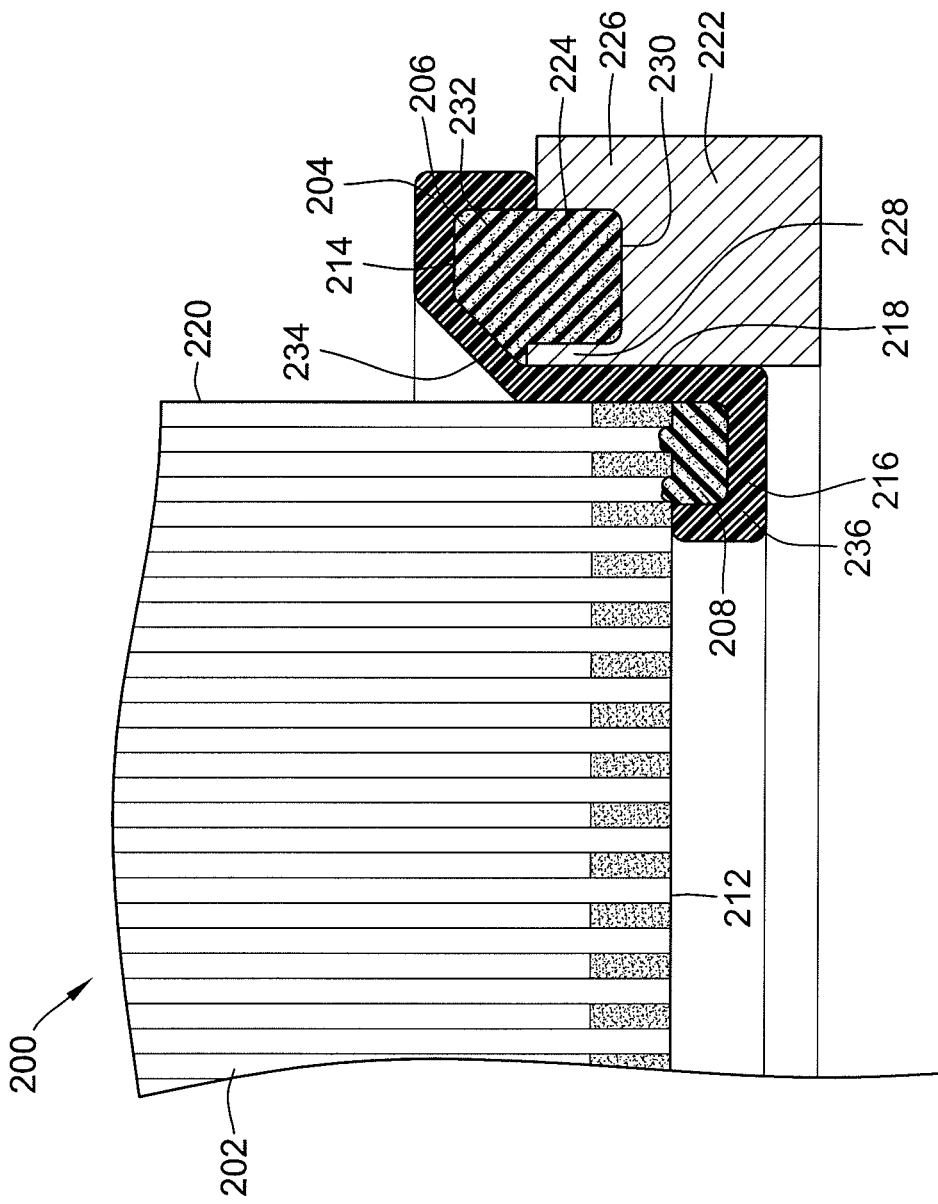
FIG. 6 is a fragmentary and cross-sectional view of the filter element of FIG. 4 showing the media pack seal member and the axial seal member in a mold.

FIGS. 4-6 illustrate a second embodiment of the present invention. Components of the filter element 200 of this embodiment are similar to those described in the first embodiment, and includes a filter media pack 202, an axial seal member 206 and a media pack seal member 208. However, unlike the axial seal gasket 104 of the filter element 100, wherein the axial seal member 106 and the media pack seal member 108 are directly attached to each other, the axial seal member 206 and the media pack seal member 208 of this embodiment are separated by a preformed frame 204.

In this embodiment, the frame 204 carries the axial seal member 206 and provides enhanced structural support than that provided by the media pack seal member 108 of the filter element 100. Additionally, the frame 204 protects the outer periphery of an outlet face 212 of the filter media pack 202 by enclosing the outer periphery. The frame 204 includes an axial seal support portion 214 and a media pack seal support portion 216, wherein the axial seal support portion 214 and the media pack seal support portion 216 are formed on the opposite side of a middle wall 218. The frame 204 is attached to the filter media pack 202 via the media pack seal member 208, wherein the media pack seal member 208 seals an interface between the outlet face 212 and frame 204. When the frame 204 is attached to the filter media pack 202, according to this embodiment, the middle wall 218 of the frame 204 abuts the circumferential wall 220 proximate the outlet face 212, such that the periphery of the outlet face 212 and a portion of a circumferential wall 220 proximate the outlet face 212 is enclosed by the media pack seal support portion 216 and the middle wall 218 of the frame 204. As shown in FIGS. 4-6, the axial seal support portion 214 projects radially, canted from the middle wall 218 and away from the circumferential wall 220.

The axial seal member 206 and the media pack seal member 208 can be formed of suitable polymeric materials as described above with regard to the axial seal member 106 and the media pack seal member 108. In one embodiment, the axial seal member 206 and the media pack member 208 are formed of a same material. For example, the axial seal member 206 and the media pack seal member 208 can both be formed of a softer urethane foam that expands more than 40% of volume during curing. In a different embodiment, the axial seal member 206 is formed of a softer urethane foam, while the media pack seal member 208 is formed of a rigid urethane.

The frame 204 may be formed with any suitable materials including, but not limited to, urethane materials, other polymers, metal and the like.

As it was with the first embodiment, a method of making the filter element 200 starts with forming the filter media pack 202. The process of forming the filter media pack 202 remains the same as described above for the filter media pack 102. The frame 204 can be formed of any suitable materials; a rigid preformed injection molded (not free rise) plastic member such as a nylon or nylon filled glass is preferred for providing the structural support.

Once the filter media pack 202 and the frame 204 are formed, the axial seal member 206 and the media pack seal member 208 are molded. In this embodiment, both the axial seal member 206 and the media pack seal member 208 are molded into a mold 222 as shown in FIG. 6., wherein the axial seal member 206 is molded first, and the media pack seal member 208 is molded subsequently.

The mold 222 includes an annular mold cavity 224, which is defined by an outer wall 226, an inner wall 228 and a bottom wall 230. In this molding process, an uncured fluid sealing material for the axial seal member 206 is poured into the annular mold cavity 224. Then, the frame 204 is inserted into the mold 222, such that the middle wall 218 of the frame 204 abuts the inner wall 228 of the mold 222, and the axial seal support portion 214 is placed over the annular mold cavity 224. When the frame 204 is inserted accordingly, an axial seal molding region 232 is formed, defined by the annular mold cavity 224 and the axial seal support portion 214. In the axial seal molding region 232, the uncured fluid seal material is allowed to foam and rise up to fill up the axial seal molding region 232, forming the axial seal member 206. The amount of the uncured fluid sealing material used is calculated to ensure that, when fully expanded and cured, the axial seal member 206 is sealed against and securely attached to inner walls of the axial seal support portion 214.

As the axial seal member 206 is forming in the axial seal molding region 232, an uncured fluid seal material for the media pack seal member 208 is poured in the media pack seal support portion 216. The filter media pack 202 is then inserted into the mold 222, with the outlet face 212 facing the media pack seal support portion 216. As the filter media pack 202 is placed into the mold 222, the filter media pack 202 may slide down a canted outer surface 234 of the frame 204 and guided down to the media pack seal support portion 216 by the middle wall 218, such that the filter media pack is placed over the media pack seal support portion 216 and supported by an outer wall 236 of the media pack seal support portion 216. As shown in FIG. 6, the circumferential wall 220 of the filter media pack 202 abuts the middle wall 218 of the frame 204, when placed in the mold 222.

In the media pack seal support portion 216, the uncured cured fluid sealing material is allowed to foam, filling up the media pack seal support portion 216, and extending into openings formed by some flutes along the outer wraps of the filter media pack 202, and sealing the interface between the frame 204 and the outlet face 212, thereby securely attaching the frame 204 to the filter media pack 202. Further, some uncured fluid sealing material may expand around the outer periphery of the filter media pack 202 and extend into a space between the middle wall 218 of the frame 204 and the circumferential wall 220 of the filter media pack 202, thereby further sealing the interface between the filter media pack 202 and the frame 204. In another embodiment, the axial seal member 206 and the media pack seal member 208 may be molded in two different molds in two different molding processes. Yet in another embodiment, the axial seal member 206 and the media pack seal member 208 are formed and attached to the frame 204 separate from the filter media pack 202, then the media pack seal member 208 and the frame 204 may be attached to the filter media pack 202 via an adhesive or the like.

Figure 9:
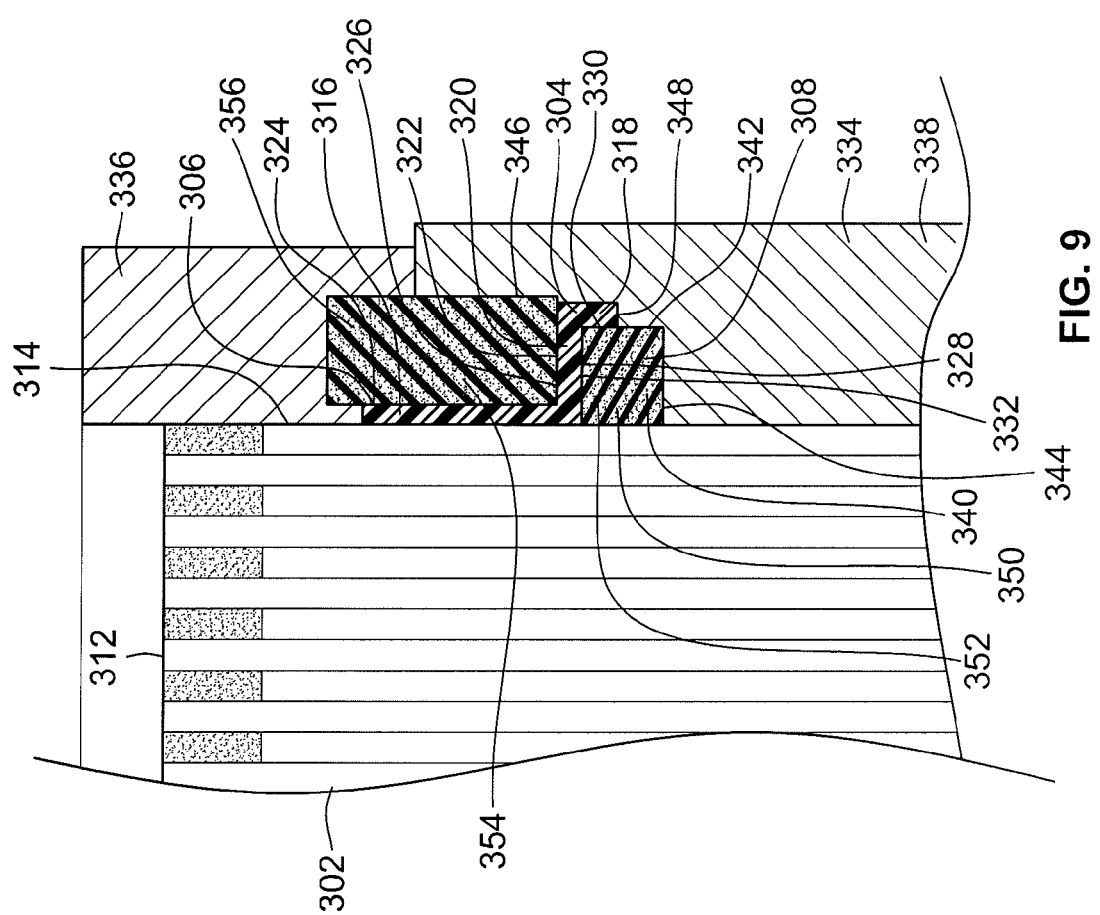
FIG. 9 is a fragmentary and cross-sectional view of the filter element of FIG. 7 showing the media pack seal member and the axial seal member in a mold.

FIGS. 7-9 illustrate a third embodiment of the present invention. A filter element 300 includes similar components as the filter element 200: a filter media pack 302, a frame 304, an axial seal member 306 and a media pack seal member 308. As it was with the filter element 200, the frame 304 carries the axial seal member 306 and is attached to the filter media pack 302 via the media pack seal member. However, unlike the frame 204, the frame 304 does not enclose the outer periphery of an outlet face 312. Instead, the frame 304 carrying the axial seal member 306 is attached on a circumferential wall 314 proximate the outlet face 312, axially spaced from the outlet face 312, similar to the filter element 100.

The frame 304 includes an inner vertical wall 316 and an outer vertical wall 318 formed on the opposite ends of a horizontal wall 320. The inner vertical wall 316 abuts the circumferential wall 314 and extends axially from the horizontal wall 320 toward the outlet face 312. The outer vertical wall 318 extends from the horizontal wall 320 toward an inlet face 310. The frame 304 has an axial seal support portion 322 and a media pack seal support portion 328 formed on the opposite sides of the horizontal wall 320. The axial seal support portion 322 is defined by an inner surface 324 of the inner vertical wall 316 and an upper surface 326 of the horizontal wall 320. Similarly, the media pack seal support portion 328 is defined by an inner surface 330 of the outer vertical wall 318 and a lower surface 332 of the horizontal wall 320.

The axial seal member 306 is formed in the axial support portion 322, while the media pack seal member 308 is formed in the media pack seal support portion 328, securely attaching the frame 304 to the filter media pack 302. The axial seal member 306 and the media pack seal member 308 can be formed of suitable polymeric materials as described above with regard to the axial seal members 106 and the media pack seal member 108. The axial seal member 306 and the media seal member 308 can be formed of a same material or different materials. In one embodiment, the axial seal member 306 and the media pack seal member 308 are both formed of a softer urethane foam. In a different embodiment, the axial seal member 306 is formed of a softer urethane foam, while the media pack seal member 308 is formed of a rigid urethane. The frame 304 may be formed with any suitable materials including, but not limited to, urethane materials, other polymers, metal and the like.

As it was with the first and second embodiments, a method of making the filter element 300 starts with forming the filter media pack 302. The process of forming the filter media pack 302 remains the same as described above for the filter media pack 102. The frame 304 can be formed of any suitable materials; preferably, a rigid polymer suitable for providing the structural support.

Once the filter media pack 302 and the frame 304 are formed, the axial seal member 306 and the media pack seal member 308 are molded into a mold 334. The mold 334 is made up of a cope 336 and a drag 338. The drag 338 includes an annular cavity 340, which is defined by a lower inner wall 342 and a bottom wall 344. An upper inner wall 346 of the drag 338 is stepped up from the inner wall 342, connected by a frame mount 348. In this embodiment, the media pack seal member 308 is molded first, and the axial seal member 306 is molded subsequently.

In this molding process, the filter media pack 302 is placed in the drag 338 with the inlet face 310 facing toward the bottom of the drag 338. Once in the drag 338, a mold cavity 350 is formed, defined by the circumferential wall 314, the bottom wall 344 and the lower inner wall 342. An uncured fluid sealing material for the media pack seal member 308 is poured into the mold cavity 350. Then, the frame 304 is inserted into the drag 338, such that the outer vertical wall 318 of the frame 304 seats on the frame mount 348 of the drag 338 and the inner vertical wall 316 abuts the circumferential wall 314. When the frame 304 is mounted on the frame mount 348, a media pack seal molding region 352 is formed, defined by the mold cavity 350 and the media pack seal support portion 328. In the media pack seal molding region 352, the uncured fluid seal material is allowed to foam and rise up to fill up the media pack seal molding region 352 and securely attaching the frame 304 to the filter media pack 302. The amount of the uncured fluid sealing material used is calculated to ensure that, when fully expanded and cured, the media pack seal member 306 is sealed against and securely attached to the circumferential wall 314 of the filter media pack 302, and the inner surface 330 of the outer vertical wall 318 and lower surface 320 of the horizontal wall 320 of the frame 304.

After the media pack seal member 308 is formed in the media pack seal molding region 352, the axial seal member 306 is formed in the mold 334. On the opposite side of the horizontal wall 300 of the frame 304, an annular mold cavity 354 is defined by the upper surface 326 of the horizontal wall 320, inner surface 324 of the inner vertical wall 316 and a portion of the upper inner wall 346 of the drag 338 that axially extends beyond the horizontal wall 320. An uncured fluid seal material for the axial seal member 306 is poured in the annular mold cavity 354. The cope 336 is then placed over the drag 338, wherein an axial seal molding region 356 is defined by the inner surfaces of the cope 336 and the annular mold cavity 354. In the axial seal molding region 356, the uncured cured fluid sealing material is allowed to foam, filling up the axial seal molding region 356, thereby forming the axial seal member 305 securely attached to the axial seal support portion 322 of the frame 304. In another embodiment, the axial seal member 306 and the media pack seal member 308 may be molded in a mold designed to form the axial seal member 306 before the media pack seal member 308. In a different embodiment, the axial seal member 306 and the media pack seal member 308 may be formed in two different molds in two different molding processes. Yet in another embodiment, the axial seal member 306 and the media pack seal member 308 are formed and attached to the frame 304 separate from the filter media pack 302, then the media pack seal member 308 and the frame 304 may be attached to the filter media pack 302 via an adhesive or the like.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element comprising:
    a fluted filter media pack having a face sheet and a fluted sheet secured together to provide a plurality of flutes including first flutes and second flutes, wherein the first flutes are closed proximate an inlet face and the second flutes are closed proximate an outlet face;
    a frame having an axial seal support portion;
    an annular seal member carried by the axial seal support portion, the annular seal member adapted for forming an axial seal;
    an annular media pack seal between the frame and the fluted media pack, the annular media pack seal comprising a polymeric material and non-removably securing the frame to the fluted filter media pack wherein the media pack seal and the annular seal member are axially spaced and located at different non-overlapping axial locations with respect to the fluted filter media pack.

2. The filter element of claim 1, wherein the annular media pack seal comprises a urethane material.

3. The filter element of claim 1, wherein the media pack seal fills an annular gap defined at least in part by the frame having a radial thickness of at least about 0.5 centimeters.

4. The filter element of claim 1, the polymeric material being of an expandable cure type that expands during curing from a liquid, wherein the annular media pack seal defines a free rise portion adapted to fill open voids between the frame and the fluted filter media pack.

5. The filter element of claim 1, wherein the annular seal member is molded independent of the annular media pack seal, and wherein the annular seal member is formed of a first polymeric material and the annular media pack seal is formed of a second polymeric material, wherein the first polymeric material is softer than the second polymeric material.

6. The filter element of claim 1, wherein the annular media pack seal is molded to a circumferential wall of the fluted filter media pack proximate the outlet face.

7. The filter element of claim 5, wherein the first polymeric material is an urethane foam having a durometer reading less than 25 A and the second polymeric material is a rigid urethane having a durometer reading greater than 60 A.

8. The filter element of claim 7, wherein the first polymeric material is an urethane foam having the durometer reading between 5 A and 8 A and the second polymeric material is a rigid urethane having the durometer reading between 90 A and 95 A.

9. The filter element of claim 7, wherein the first polymeric material is a urethane material that expands more than 40% in volume during curing and the second polymeric material is a urethane material that expands less than 40% in volume during curing.

10. The filter element of claim 9, wherein the first polymeric material is a urethane material that expands about 60% in volume during curing and the second polymeric material is a urethane material that expands about 25% in volume during curing.

11. The filter element of claim 1, wherein the annular seal member and the annular media pack seal are formed of a same polymer material.

12. The filter element of claim 1, wherein the frame includes a divider portion extending radially with respect to the fluted filter media pack, the divider portion providing said axial spacing and said different non-overlapping relations.

13. A filter element comprising:
    a fluted filter media pack having a face sheet and a fluted sheet secured together to provide a plurality of flutes including first flutes and second flutes, wherein the first flutes are closed proximate an inlet face and the second flutes are closed proximate an outlet face;
    a frame having an axial seal support portion;
    an annular seal member carried by the axial seal support portion, the annular seal member adapted for forming an axial seal; and
    an annular media pack seal between the frame and the fluted media pack, the annular media pack seal comprising a polymeric material, wherein the frame encloses an outer periphery of the outlet face and a portion of a circumferential wall of the fluted filter media pack proximate the outlet face, wherein the annular media pack seal is molded onto the outer periphery of the outlet face, wherein at least some annular media pack seal extends into openings formed by some flutes along outer wraps of the fluted filter media pack, thereby sealing an outer wrap of the fluted filter media pack and an annular interface between the fluted filter media pack and the frame.

14. The filter element of claim 13, wherein the axial seal support portion radially extends away from the circumferential wall carrying the annular seal member in a spaced relation to the fluted filter media pack, wherein the frame includes a middle wall separating the annular seal member from the annular media pack seal, wherein the annular seal member is configured to seal against a sealing surface of a filter housing and the frame provides a structural support when the filter element is installed in the filter housing.

15. A filter element comprising:
    a fluted filter media pack having a face sheet and a fluted sheet secured together to provide a plurality of flutes including first flutes and second flutes, wherein the first flutes are closed proximate an inlet face and the second flutes are closed proximate an outlet face;
    a frame having an axial seal support portion;
    an annular seal member carried by the axial seal support portion, the annular seal member adapted for forming an axial seal; and
    an annular media pack seal between the frame and the fluted media pack, the annular media pack seal comprising a polymeric material, wherein the annular media pack seal is molded to a circumferential wall of the fluted filter media pack proximate the outlet face, wherein the frame includes an inner vertical wall and an outer vertical wall formed on the opposite ends of a horizontal wall, the inner vertical wall extending toward the outlet face and the outer vertical wall extending toward the inlet face, wherein the annular seal member is securely attached to one surface of the inner vertical wall and one surface of the horizontal wall, wherein the other surface of the inner vertical wall abuts the circumferential wall, wherein the annular media pack seal is securely attached to the circumferential wall of the fluted filter media pack, the other surface of the horizontal wall and one surface of the outer vertical wall, wherein the annular seal member is configured to seal against a sealing surface of a filter housing and the frame provides a structural support when the filter element is installed in the filter housing.

16. A filter element comprising:
a fluted filter media pack having a face sheet and a fluted sheet secured together to provide a plurality of flutes, wherein the first flutes are closed proximate an inlet face and the second flutes are closed proximate an outlet face; and
an axial seal gasket assembly comprising an axial seal member and a media pack seal member, wherein the axial seal member is formed of a first polymeric material and the media pack seal member is formed of a second polymeric material, wherein the first polymeric material is softer than the second polymeric material;
a frame having an axial seal support portion projecting radially outward to have opposing top and bottom surfaces, the top surface facing toward the inlet face and the bottom surface facing toward the outlet face;
the axial seal member carried by the axial seal support portion, the axial seal member adapted for forming an axial seal;
the media pack seal member between the frame and the fluted media pack, the media pack seal member comprising a polymeric material; and
wherein the axial seal member is situated on only one of the opposing top and bottom surfaces, wherein one of the top and bottom surfaces is free of the axial seal member.

17. The filter element of claim 16, wherein the media pack seal member comprises a urethane material.

18. The filter element of claims 16, wherein the media pack seal member fills an annular gap defined at least in part by the frame having a radial thickness of at least about 0.5 centimeters.

19. The filter element of any of claims 16, the polymeric material being of an expandable cure type that expands during curing from a liquid, wherein the media pack seal member defines a free rise portion adapted to fill open voids between the frame and the fluted filter media pack.

20. The filter element of any of claims 16, wherein the annular seal member is molded independent of the annular media pack seal member, and wherein the axial seal member is formed of a first polymeric material and the media pack seal member is formed of a second polymeric material, wherein the first polymeric material is softer than the second polymeric material.

21. The filter element of any of claims 16, wherein the first polymeric material is an urethane foam having a durometer reading less than 25 A and the second polymeric material is a rigid urethane having a durometer reading greater than 60 A.

22. The filter element of claim 21, wherein the first polymeric material is an urethane foam having the durometer reading between 5 A and 8 A and the second polymeric material is a rigid urethane having the durometer reading between 90 A and 95 A, wherein the first polymeric material is a urethane material that expands about 60% in volume during curing and the second polymeric material is a urethane material that expands about 25% in volume during curing.

23. The filter element of any of claim 16, wherein the first polymeric material is a urethane material that expands more than 40% in volume during curing and the second polymeric material is a urethane material that expands less than 40% in volume during curing.

24. A filter element comprising:
a fluted filter media pack having a face sheet and a fluted sheet secured together to provide a plurality of flutes including first flutes and second flutes, wherein the first flutes are closed proximate an inlet face and the second flutes are closed proximate an outlet face; and
an axial seal gasket assembly comprising an axial seal member and a media pack seal member, wherein the axial seal member is formed of a first polymeric material and the media pack seal member is formed of a second polymeric material, wherein the first polymeric material is softer than the second polymeric material, a frame having an axial seal support portion;
the axial seal member carried by the axial seal support portion, the axial seal member adapted for forming an axial seal; and
the media pack seal member between the frame and the fluted media pack, the media pack seal member comprising a polymeric material, wherein the frame encloses an outer periphery of the outlet face and a portion of a circumferential wall of the fluted filter media pack proximate the outlet face, wherein the media pack seal member is molded onto the outer periphery of the outlet face, wherein at least some media pack seal member extends into openings formed by some flutes along outer wraps of the fluted filter media pack, thereby sealing an outer wrap of the fluted filter media pack and an annular interface between the fluted filter media pack and the frame.

25. The filter element of claim 24, wherein the axial seal support portion radially extends away from the circumferential wall carrying the axial seal member in a spaced relation to the fluted filter media pack, wherein the frame includes a middle wall separating the axial seal member from the media pack seal member, wherein the axial seal member is configured to seal against a sealing surface of a filter housing and the frame provides a structural support when the filter element is installed in the filter housing.

26. A filter element comprising:
a fluted filter media pack having a face sheet and a fluted sheet secured together to provide a plurality of flutes including first flutes and second flutes, wherein the first flutes are closed proximate an inlet face and the second flutes are closed proximate an outlet face; and
an axial seal gasket assembly comprising an axial seal member and a media pack seal member, wherein the axial seal member is formed of a first polymeric material and the media pack seal member is formed of a second polymeric material, wherein the first polymeric material is softer than the second polymeric material, a frame having an axial seal support portion;
the axial seal member carried by the axial seal support portion, the axial seal member adapted for forming an axial seal; and
the media pack seal member between the frame and the fluted media pack, the media pack seal member comprising a polymeric material, wherein the media pack seal member is molded to a circumferential wall of the fluted filter media pack proximate the outlet face, and wherein the frame includes an inner vertical wall and an outer vertical wall formed on the opposite ends of a horizontal wall, the inner vertical wall extending toward the outlet face and the outer vertical wall extending toward the inlet face, wherein the annular seal member is securely attached to one surface of the inner vertical wall and one surface of the horizontal wall, wherein the other surface of the inner vertical wall abuts the circumferential wall, wherein the annular media pack seal member is securely attached to the circumferential wall of the fluted filter media pack, the other surface of the horizontal wall and one surface of the outer vertical wall, wherein the annular seal member is configured to seal against a sealing surface of a filter housing and the frame provides a structural support when the filter element is installed in the filter housing.

* * * * *